(12) United States Patent
Slik

(10) Patent No.: US 10,474,624 B2
(45) Date of Patent: *Nov. 12, 2019

(54) SYSTEMS AND METHODS FOR USING RESOURCES IN A NETWORKED COMPUTING ENVIRONMENT

(71) Applicant: NETAPP, INC., Sunnyvale, CA (US)

(72) Inventor: David Slik, Lasqueti Island (CA)

(73) Assignee: NETAPP, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,692

(22) Filed: May 10, 2019

(65) Prior Publication Data

US 2019/0286611 A1 Sep. 19, 2019

Related U.S. Application Data

(63) Continuation of application No. 15/604,492, filed on May 24, 2017, now Pat. No. 10,318,476.

(51) Int. Cl.
| | |
|---|---|
| *G06F 15/173* | (2006.01) |
| *G06F 3/06* | (2006.01) |
| *G06F 13/40* | (2006.01) |
| *G06F 13/42* | (2006.01) |

(52) U.S. Cl.
CPC ........ *G06F 15/17337* (2013.01); *G06F 3/065* (2013.01); *G06F 3/067* (2013.01); *G06F 3/0614* (2013.01); *G06F 3/0688* (2013.01); *G06F 13/4022* (2013.01); *G06F 13/4286* (2013.01); *G06F 15/17306* (2013.01); *G06F 2213/0026* (2013.01)

(58) Field of Classification Search
None
See application file for complete search history.

*Primary Examiner* — Idriss N Alrobaye
*Assistant Examiner* — Dayton Lewis-Taylor
(74) *Attorney, Agent, or Firm* — Klein, O'Neill & Singh, LLP

(57) ABSTRACT

Methods and systems for a networked computing system are provided. One method includes generating, based on a first topology, a first proxy endpoint by a first device of a first pluggable compute module; establishing a communication tunnel between the first proxy endpoint and a non-volatile memory express (NVMe) storage device for peer-to-peer communication between the first proxy endpoint of the first device and a controller of the NVMe storage device. An NVMe translation module receives a request for the NVMe storage device from the first proxy endpoint and the NVMe translation module translates the request to an NVMe request for the NVMe storage device for accessing storage space at the NVMe storage device. The method further includes de-allocating the first proxy endpoint, when the first topology is deactivated making the first pluggable compute module and the NVMe storage device available for a second topology.

20 Claims, 15 Drawing Sheets

SYSTEMS AND METHODS FOR USING RESOURCES IN A NETWORKED COMPUTING ENVIRONMENT

CROSS-REFERENCE TO RELATED APPLICATION

This patent application claims priority of and is a continuation of U.S. patent application Ser. No. 15/604,492, filed on May 24, 2017, the disclosure of which is incorporated herein by reference in its entirety.

TECHNICAL FIELD

The present disclosure relates to innovative technology for dynamically using compute and other resources in a networked computing environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others. A storage system typically includes at least one computing system executing a storage operating system for storing and retrieving data on behalf of one or more client computing systems ("clients"). The storage operating system stores and manages shared data containers in a set of mass storage devices.

Solid state drives (SSDs) are becoming popular for data storage since they provide high bandwidth and low latency. One upcoming protocol used for SSDs is the Non-Volatile memory Express (NVMe) protocol (or specification) to transport data over different media types. NVMe commonly uses the Peripheral Component Interconnect Express ("PCIe") protocol as the transport medium.

"NVMe over fabrics" has been developed to enable NVMe message-based commands to transfer data between a host computer and target solid-state storage device or system over a network such as Ethernet, Fibre Channel (FC), InfiniBand and others. However, these networks increase latency and often reduce through when compared with PCIe.

Computing applications are struggling to effectively use the high bandwidth and low latency of NVMe storage appliances. Applications outside of an NVMe fabric that has a plurality of NVMe devices may experience bottlenecks because network throughput is not fast enough to accommodate the low latency and performance of the NVMe devices. To accommodate the high throughput of NVMe storage, users may have to move to storage which is directly attached to each computing node, which is more costly and not suitable for applications that require many computing nodes to share access the same data. Customers may also be underutilizing NVMe storage shelves with a plurality of NVMe storage devices. Continuous efforts are being made to better utilize storage resources while providing cost-effective computing abilities.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, pluggable compute and accelerator modules with novel bridging technology are provided. The bridging technology may be implemented using Field Programmable Gate Arrays (FPGAs), ASICs, or any other configuration. The pluggable modules may be installed within a system chassis instead of flash drives. Each module is configured with a non-transparent bridge (NTB) that mediates and secures access to a peripheral bus (for example, the Peripheral Component Interconnect (PCI)-Express (PCIe) bus). The pluggable modules are used on as need basis, based on a user operating environment.

In one aspect, the NTB advertises itself as a "stub device" to a root complex of a storage server/system so that the NTB can send and receive peer-to-peer communication routed through a PCIe fabric, described below in detail. Each NTB also discovers other NTBs and hence is able to communicate with other pluggable modules also described below in detail. In one aspect, the NTB device enables creation of virtual tunnels and proxy endpoints for securely partitioning and using resources on demand, for example, NVMe storage, FPGAs, graphics processing units (GPUs), network adapters, compute modules and others.

Figure 1A:
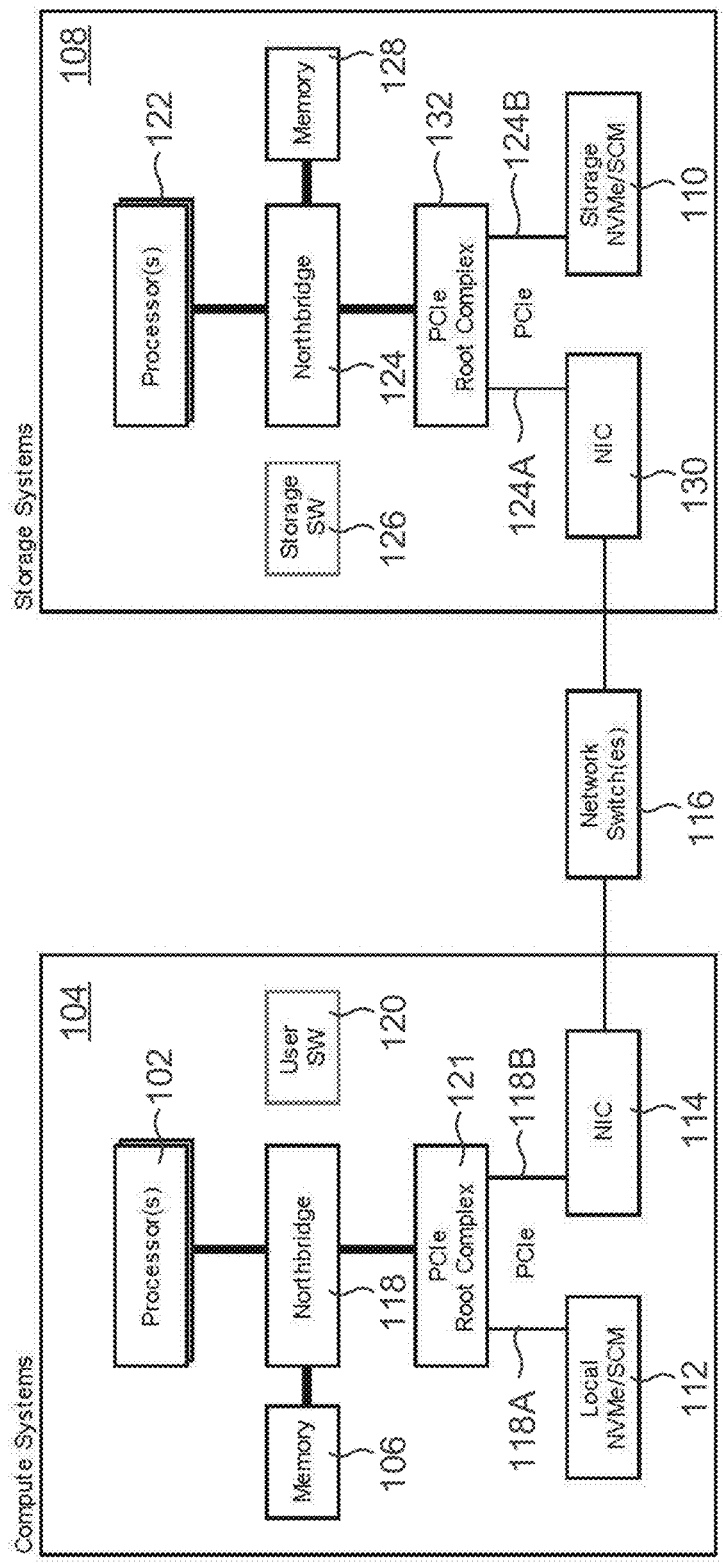
FIG. 1A shows an example of a compute system interfacing with a storage system.

System 100:

FIG. 1A shows an example of an operating environment 100 (also referred to as system 100) that using the innovative technology of the present disclosure. System 100 may include a plurality of compute systems 104 (may also be referred to interchangeably as computing system, computing systems, server, servers, host system or host systems 104) that may access one or more storage systems 108 via a connection system using one or more network switches 116 in a network including a local area network (LAN), wide area network (WAN), the Internet and others.

Compute systems 104 are computing devices configured to execute user software (shown as "User SW" and may also be referred to as "application' or "applications") 120 over a variety of operating systems, including the UNIX® and Microsoft Windows® operating systems (without derogation of any third party trademark rights). User SW 120 may utilize storage services of the storage system 108 to access, store, and manage data in a set of storage devices 110 described below in detail.

Compute systems 104 generally utilize file-based access protocols when accessing information (in the form of files and directories) over a network attached storage (NAS)-based network protocol. Alternatively, compute systems 104 may use block-based access protocols, for example, the Small Computer Systems Interface (SCSI) protocol encapsulated over TCP/IP (iSCSI) and SCSI encapsulated over Fibre Channel (FCP) to access storage via a storage area network (SAN). The adaptive aspects described herein are not limited to any specific protocol used to access storage system 108.

In one aspect, compute system 104 may also execute a virtual machine environment. In the virtual machine environment a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

A virtual machine monitor (VMM), for example, a processor executed Hypervisor layer provided by VMWare Inc., Hyper-V layer provided by Microsoft Corporation (without derogation of any third party trademark rights) or any other layer type, presents and manages the plurality of guest OS. VMM may include or interface with a virtualization layer (VIL) that provides one or more virtualized hardware resource to each guest OS. For example, the VIL presents physical storage at storage devices as virtual storage (for example, as a virtual hard drive (VHD)) to VMs. The VMs use the VHDs to store information at the storage systems 108.

In one aspect, compute system 104 includes one or more processors 102 operating as CPUs (central processing units) (may also be referred to as CPU 102 or CPUs 102) and memory 106, coupled to a bus system. The bus system is an abstraction that represents any one or more separate physical buses and/or point-to-point connections, connected by appropriate bridges, adapters and/or controllers. The bus system therefore, may include, for example, a PCIe bus, a HyperTransport bus, an industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). The examples of the present disclosure are described herein with respect to using PCIe, however, the various adaptive aspects of the present disclosure are not limited to PCIe or any other standard and/or proprietary bus system that supports peer-to-peer communication.

As an example, the compute system 104 includes a Northbridge 118 for coupling processors 102 to memory 106 and to a root complex 105. A Northbridge is a chip in a core logic chipset architecture on a motherboard. The Northbridge is typically connected directly to the CPU for tasks that require the highest performance. The root complex 121 in a PCIe system connects the processor 102 and memory 106 sub stem to other devices (e.g. a local storage device 112 and a network adapter 114 (shown as NIC (network interface card)) using a PCI Express switch fabric (not shown in FIG. 1A) composed of one or more PCIe switch devices. The root complex 121 can include PCIe ports that connect to other devices in the system. The root complex 121 generates transaction requests on behalf of processor 102. Root complex functionality may be implemented as a discrete device, or may also be integrated with the processor.

The processors 102 control the overall operation of compute system 104. In certain aspects, the processors 102 accomplish this by executing programmable instructions stored in memory 106. As an example, the processors 102 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 106 represents any form of random access memory (RAM) including dynamic random access memory (DRAM), read-only memory (ROM), flash memory, or the like, or a combination of such devices. Memory 106 includes the main memory of the compute system 104 and application 120 may be executed out of memory 106.

As mentioned above, also connected to the CPUs 102 through the Northbridge 118 and root complex 121 are one or more local storage devices 112 via a PCIe link 118A, and NIC 114 via a PCIe link 118B. Local storage devices 112 may be or may include any conventional medium for data in a non-volatile manner. In one aspect, local storage devices 112 are solid-state drives (SSDs), flash drives or any other storage media type that are accessed using the NVMe protocol defined by the NVMe specification. NVMe provides a logical device interface specification that enables access to storage devices using a PCIe link (for example, 118A). NVMe has been developed to provide access to storage at low latency and exploit parallelism of SSDs.

NIC 114 enables compute system 104 to communicate with remote devices (e.g., storage systems 108) over a network using one or more network switch 116. NIC 114 may be an Ethernet adapter, a FC adapter, a Fibre Channel over Ethernet (FCoE), an InfiniBand adapter or any other adapter type. NIC 114 comprises a plurality of ports adapted to couple compute system 104 to other systems over point-to-point links, wide area networks, virtual private networks implemented over a public network (Internet) or a shared local area network using one or more switches 116. NIC 114 thus may comprise the mechanical, electrical and signaling circuitry needed to connect compute system 104 to network switches 116.

The compute system 104 may also include one or more input/output (I/O) devices for example, a display device, a keyboard, a mouse, etc., the details of which are not germane to the adaptive aspects of the present disclosure.

In one aspect, storage system 108 may include a plurality of processors (or CPUs) 122, a memory 128, and a NIC 130 interconnected by a Northbridge 124 that is coupled to a root complex 132 (also referred to as a host PCIe root complex). NIC 130 is accessed using PCIe link 124A, while storage devices 110 are accessed by one or more PCIe links 124B. Storage devices 110 are NVMe based SSDs, as described below in detail.

Processors 122 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Memory 128 represents any form of random access memory (RAM) including dynamic random access memory (DRAM), read-only memory (ROM), flash memory, or the like, or a combination of such devices.

In one aspect, the storage system 108 is a multi-processor storage system executing a storage operating system (shown as Storage SW (software)) 126 that preferably implements a high-level module, such as a file system, to logically organize information as a hierarchical structure of named directories, files and special types of files called virtual disks (hereinafter generally "blocks") at storage devices 110. However, it will be apparent to those of ordinary skill in the art that the storage system 108 may alternatively comprise a single processor system.

The memory 128 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 126, portions of which is typically resident in memory 128 and executed by the processing elements, functionally organizes the storage system 108 by, inter alia, invoking storage operations in support of the storage service provided by storage systems 108. A non-limiting example of the storage operating system 126 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

NIC 130 comprises a plurality of ports adapted to couple storage system 108 to one or more server systems over point-to-point links, wide area networks, virtual private networks implemented over a public network (Internet) or a shared local area network. NIC 130 thus may comprise the mechanical, electrical and signaling circuitry needed to connect storage system 108 to the network.

In one aspect, system 100 may also include a cloud provider (not shown) for enabling cloud computing. The cloud provider may be a collection of computing device/VM executing an application for providing cloud based computing services. Cloud computing means computing capability that provides an abstraction between a computing resource and its underlying technical architecture (e.g., servers, storage, networks), enabling convenient, on-demand network access to a shared pool of configurable computing resources that can be rapidly provisioned and released with minimal management effort or service provider interaction.

In the cloud computing environment, storage space at storage system 108 is made available to clients by the cloud provider for storing information. Typically, the cloud provider licenses storage space to clients for storing and accessing data. The storage space may be used by one or more applications.

Figure 1B:
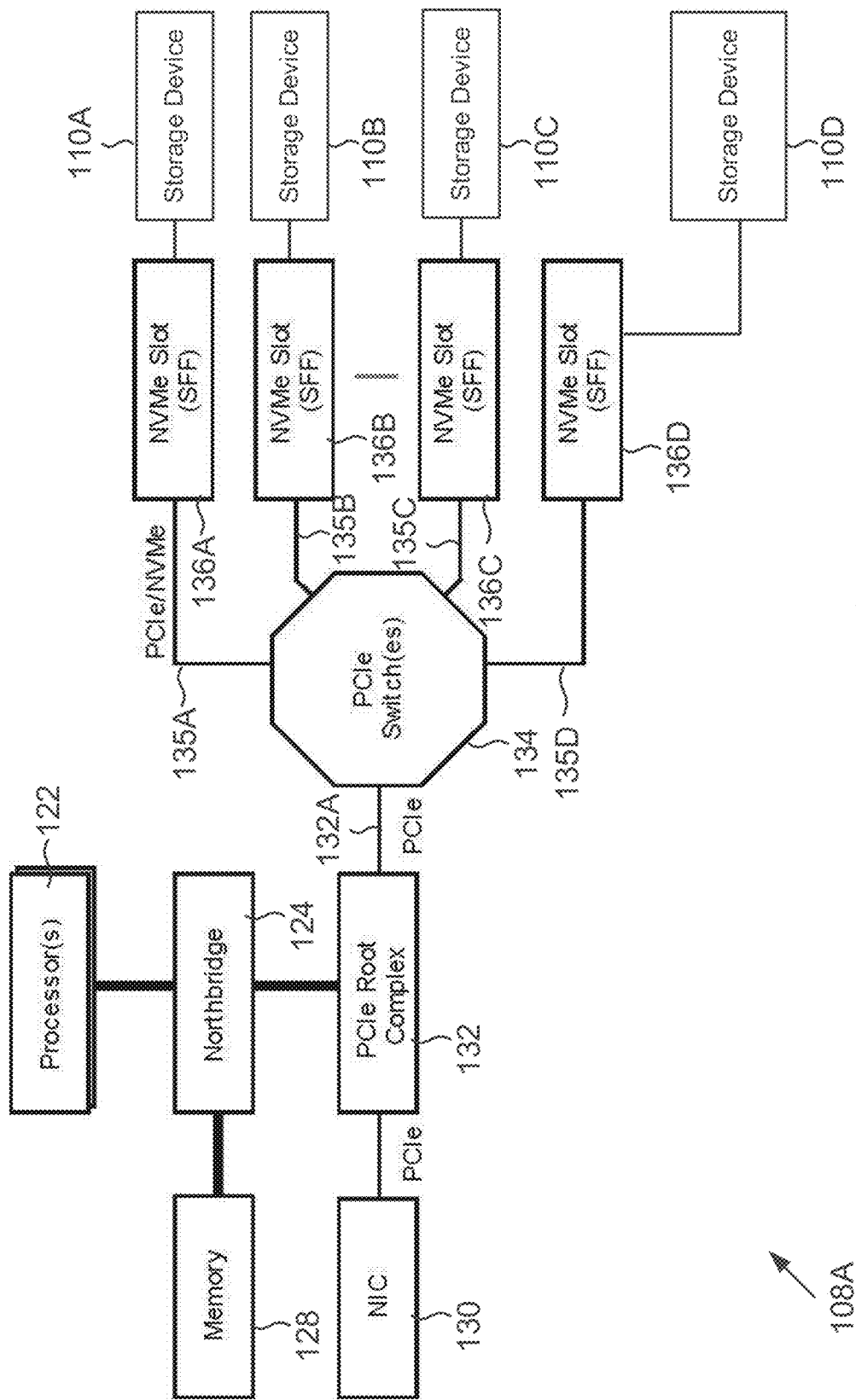
FIG. 1B shows an example of an enterprise storage system, used according to one aspect of the present disclosure.

Enterprise Storage System 108A:

FIG. 1B shows an example of an enterprise storage system 108A (may be referred to as storage system 108A for brevity), used according to one aspect of the present disclosure. It is noteworthy that various components of the enterprise storage system 108A are similar to the storage system 108 described above in detail and are shown using the same reference numbers. Furthermore, any reference to a storage system herein is intended to include both storage system 108 and 108A.

The storage system 108A has access to multiple storage devices 110A-110D (may be referred to as storage device 110 or storage devices 110) via multiple NVMe slots 136A-136D connected to PCIe switch 134 via multiple PCIe links 135A-135D (shown as PCIe/NVMe links 135A-135D). The PCIe switch 134 enables access to various storage devices via the NVMe slots 136A-136D. It is noteworthy that although only four NVMe slots and one PCIe switch is shown, the adaptive aspects of the present disclosure are not limited to any particular number of slots and switches.

In one aspect, storage system 108A may have a distributed architecture, for example, a cluster based system that may include a separate network module and storage module. Briefly, the network module is used to communicate with compute systems 104, while the storage module is used to communicate with the storage devices 110. In the cluster environment, storage system 108A may also use a cluster access adapter (not shown) to enable communication between various cluster nodes (i.e. network and storage modules).

In another aspect, the storage system 108A may also use a storage adapter (not shown) that cooperates with the storage operating system 126 to access information requested by the compute systems 104. The storage adapter comprises a plurality of ports having input/output (I/O) interface circuitry that couples to the storage devices over an I/O interconnect arrangement, such as a conventional high-performance, FC link topology. In yet another aspect, instead of a storage adapter, a converged network adapter (e.g. an FCoE) adapter may be used to access storage devices 110.

In one aspect, storage system 108A can be organized into any suitable number of virtual servers (VServer or storage virtual machines (SVM)), in which each virtual storage system represents a single storage system namespace with separate network access. Each virtual storage system has a user domain and a security domain that are separate from the user and security domains of other virtual storage systems. Compute systems 104 can access storage space via a VServer.

In one aspect, storage system 108A is a shared storage system providing access to a set of storage devices 110 accessed using NVMe slots. As an example, the storage devices 110 may be a part of a storage array within a storage sub-system (not shown). The storage devices 110 may include writable storage device media such as self-encrypting SSDs, flash memory devices and any other media type adapted to store information. The storage devices may be organized as one or more groups of Redundant Array of Independent (or Inexpensive) Disks (RAID). The various aspects disclosed herein are not limited to any particular storage device or storage device configuration.

In one aspect, to facilitate access to storage devices 110, the storage operating system 126 "virtualizes" the storage space provided by storage devices 110. The storage system 108A can present or export data stored at storage devices 110 to compute systems 104 as a storage volume or one or more qtree sub-volume units including LUNs. Each storage volume (or LUN) may be configured to store data files (or data containers or data objects), scripts, word processing documents, executable programs, and any other type of structured or unstructured data. From the perspective of the VMS/computing systems, each volume can appear to be a single drive. However, each volume can represent the storage space in one drive, an aggregate of some or all of the storage space in multiple drives, a RAID group, or any other suitable set of storage space.

The storage system 108A may be used to store and manage information at storage devices 110 based on a request generated by compute system 104. The request may be based on file-based access protocols, for example, the CIFS or the NFS protocol, over TCP/IP. Alternatively, the request may use block-based access protocols, for example, iSCSI, FCP or any other protocol.

As an example, in a typical mode of operation, compute system 104 transmits one or more input/output (I/O) commands, such as an NFS or CIFS request, over network switch 116 to the storage system 108A. Storage system 108A receives the request, issues one or more I/O commands to storage devices 110 to read or write the data on behalf of the server system 104, and issues an NFS or CIFS response containing the requested data over the network switch 116 to the respective compute system 104.

Figure 2:
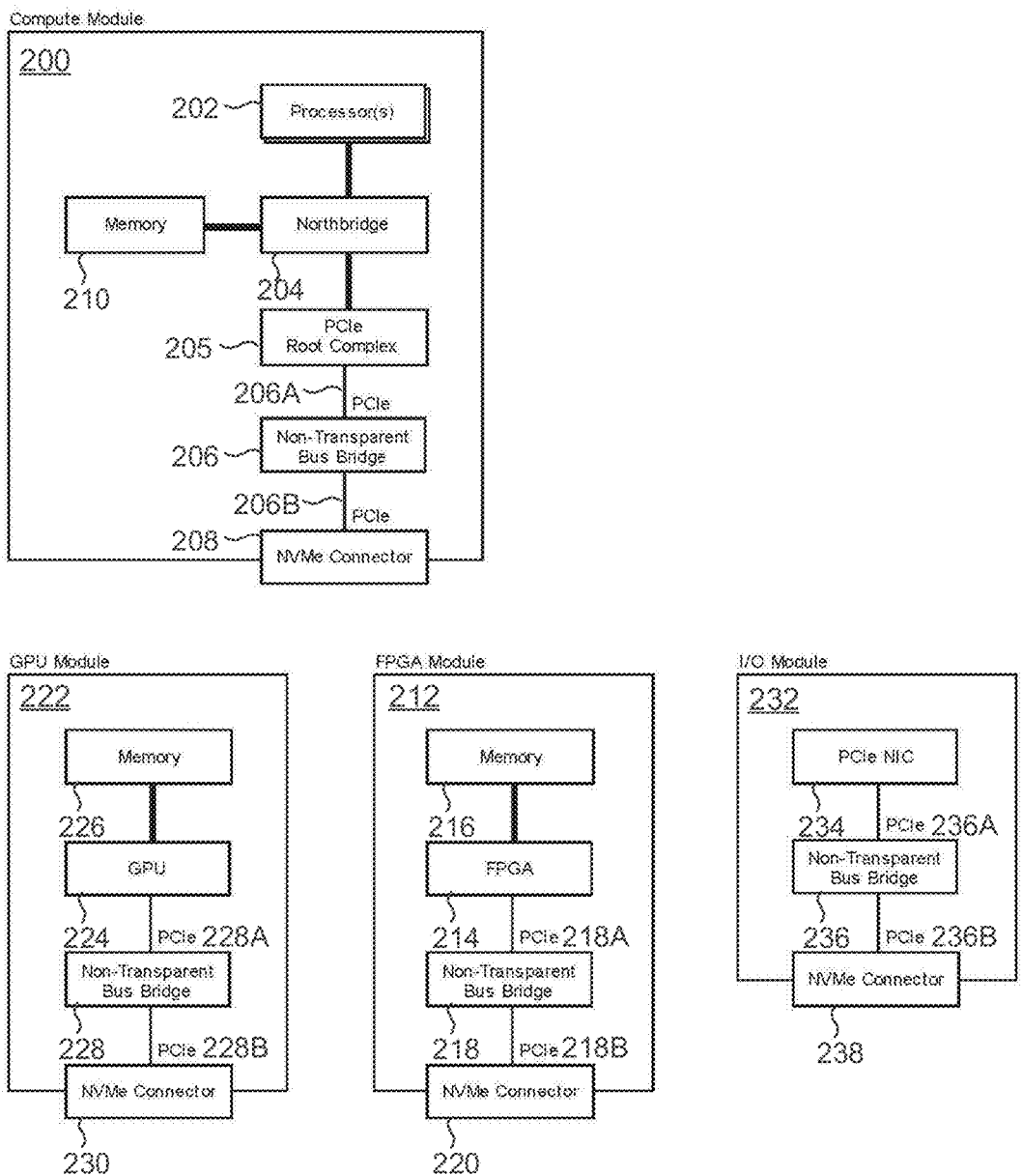
FIG. 2 shows examples of various pluggable modules using the innovative non-transparent bridge (NTB) technology, according to one aspect of the present disclosure.

Pluggable Compute/FPGA/GPU/IO Modules:

FIG. 2 shows examples of various pluggable modules, including a compute module 200, a FPGA module 212, a GPU (Graphics Processing Unit) 222 and an I/O (Input/Output) module 232, according to one aspect of the present disclosure based on the innovative NTB technology of the present disclosure. The various pluggable modules may be used together or separately within a storage system chassis using available NVMe slots, for example, small form factor (SFF) slots.

In one aspect, the pluggable CPU module 200 includes one or more CPUs 202 having access to a memory 210 via a Northbridge 204 (similar to Northbridge 118, FIG. 1A). CPUs 202 execute user applications/software instructions from memory 210.

The Northbridge 204 is coupled to a PCIe root complex 205 that in turn is coupled to a NTB 206 via a PCIe link 206A. The NTB 206 is coupled to an NVMe connector 208 via a PCIe link 206B. The NVMe connector 208 connects the compute module 200 to a NVMe slot (e.g. 136A, FIG. 1B) to access NVMe based resources, e.g., an NVMe based storage device 110 or to other resources including the GPU module 222, the FPGA module 212 and I/O module 232, as described below in detail.

The compute module 200 appears like a PCIe endpoint, when inserted into a NVMe storage system. The NTB 206 creates and enables proxy endpoints, described below in detail, to be mapped to the root complex 205 providing NVMe storage access to processor 202 as well as access to other pluggable modules.

The pluggable FPGA module 212 is configured to operate as accelerator hardware that can be reprogrammed over the PCIe bus. The FPGA module 212 may be reset based on PCIe commands from the compute module 200.

In one aspect, the FPGA module 212 includes a FPGA 214 that is coupled to a memory 216. Memory 216 stores data that is processed by the FPGA. In one aspect, FPGA 214 is also coupled to a NTB 218 via a PCIe link 218A. The NTB 218 is coupled to an NVMe connector 220 via a PCIe link 218B. The NVMe connector 220 provides access to the FPGA module 212 using the innovative tunnelling technology described below in detail.

In one aspect, the pluggable GPU module 222 can also be accessed using a PCIe bus. The GPU module 222 may be used by the compute module 200 for hardware acceleration. The GPU module 222 includes a GPU 224 that is coupled to a memory 226. The GPU module 224 executes programmed instructions stored at memory 226. The GPU module 226 is also coupled to a NTB 228 via a PCIe link 228A. The NTB 228 is coupled to an NVMe connector 230 via a PCIe link 228B. The NVMe connector 230 provides access to the GPU module 222 using the innovative tunnelling technology described below in detail.

The pluggable I/O module 232 includes a PCIe NIC 234 that is coupled to a NTB 236 via a PCIe link 236A. The NTB 236 is also coupled to an NVMe connector 238 via PCIe link 236B. The NVMe connector 236 provides access to the I/O module 232 using the innovative tunnelling technology described below in detail.

Figure 3A:
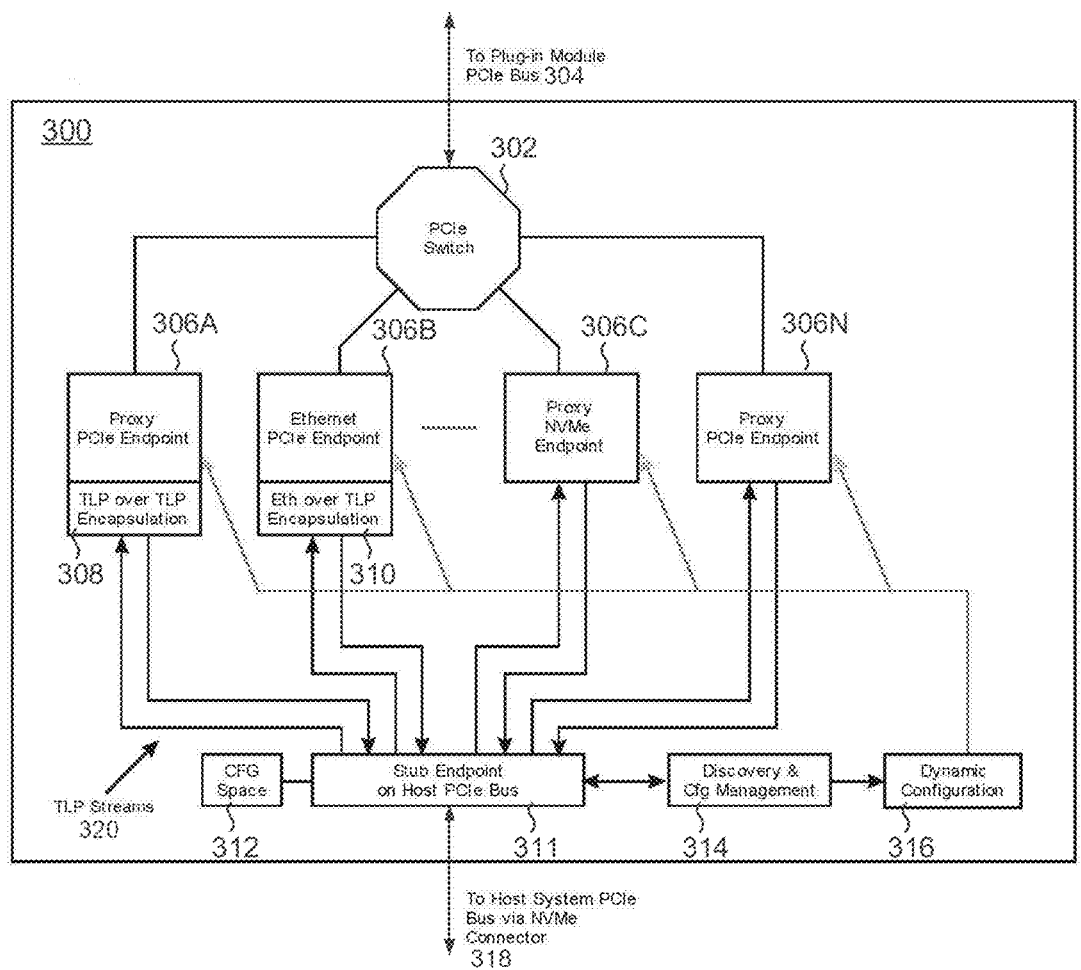
FIG. 3A shows an example of the NTB, according to one aspect of the present disclosure.

NTB 300:

FIG. 3A shows a block diagram of the innovative NTB 300, according to one aspect of the present disclosure. NTB 300 may be implemented as an ASIC, FPGA or in any other configuration. NTB 300 is similar to the NTB 206, 218, 228 and 236, respectively, used at the various pluggable modules of FIG. 2. In one aspect, a conventional NTB typically requires software drivers on both sides of the bridge (i.e. upstream and downstream), the innovative NTB of the present disclosure does not require software drivers on either side, making the design and implementation more efficient and cost-effective.

In one aspect, NTB 300 is coupled to an NVMe based storage system via connection 318. Connection 318 is enabled using NVMe connectors, e.g., 208, 220, 230 and 238, described above with respect to FIG. 2. Connection 318 connects the NTB to the storage system PCIe bus.

In one aspect, NTB 300 is coupled to the CPU module 202, FPGA 214, GPU module 224 and PCIe NIC 234 via a connection 304. Connection 304 may use a root complex of the CPU module 200, as described above.

NTB 300 enables dynamic creation of proxy PCIe endpoints 306A-306N based on a user desired topology to bind a resource to the pluggable module. The term topology as used herein means a NTB and another device/resource that is accessed using the NTB and the innovative tunnelling technology described herein.

NTB 300 enables dynamic creation of TLP (transaction layer packet) tunnels for the various pluggable modules described above with respect to FIG. 2. PCIe uses multiple layers to process data. One such layer is called the transaction layer. In the transaction layer, various packet types, e.g., memory read, memory write, I/O read, I/O write, message, completion and others arrive on a PCIe link. The transaction layer accepts and issues packets in a specific format called "transaction layer packets" (TLPs) defined by the PCIe specification.

When a pluggable compute module communicates with another compute module, then the tunnel is enabled by an Ethernet PCIe endpoint 306B using an Ethernet over TLP encapsulation module 310 (may be referred to as module 310). When the pluggable compute module 200 interfaces with other resources or modules, then the TLP over TLP encapsulation module 308 (may be referred to as module 308) is used. The TLP streams 320 are used to send and receive information using the TLP tunnels.

Access to the resources are made available through a stub endpoint 311 that includes logic and circuitry to interface with the storage system PCIe bus through a NVMe connector, for example, 208 (FIG. 2). The use of peer-to-peer communication through the stub endpoint 311 eliminates the need for the storage system to have drivers for the NTB.

Once the proxy endpoints (306A-306N) are not needed, the endpoints and the associated tunnels are deleted for optimum resource utilization. In one aspect, the endpoints and the tunnels can be created without any reprogramming of the NTB 300.

In one aspect, NTB 300 also includes a configuration space (shown as CFG Space) 312 that stores PCIe register space configuration information for various resources. A discovery and configuration management module (may be referred to as discovery module) 314 is used to perform discovery and configuration operations, described below in detail. The various proxy endpoints are created by a dynamic configuration module 316 on an as need basis, as described below in detail. It is noteworthy that the discovery module 314 and dynamic configuration module 316 may be stored as firmware instructions for NTB 300 at a memory device (not shown) of the NTB 300.

Figure 3B:
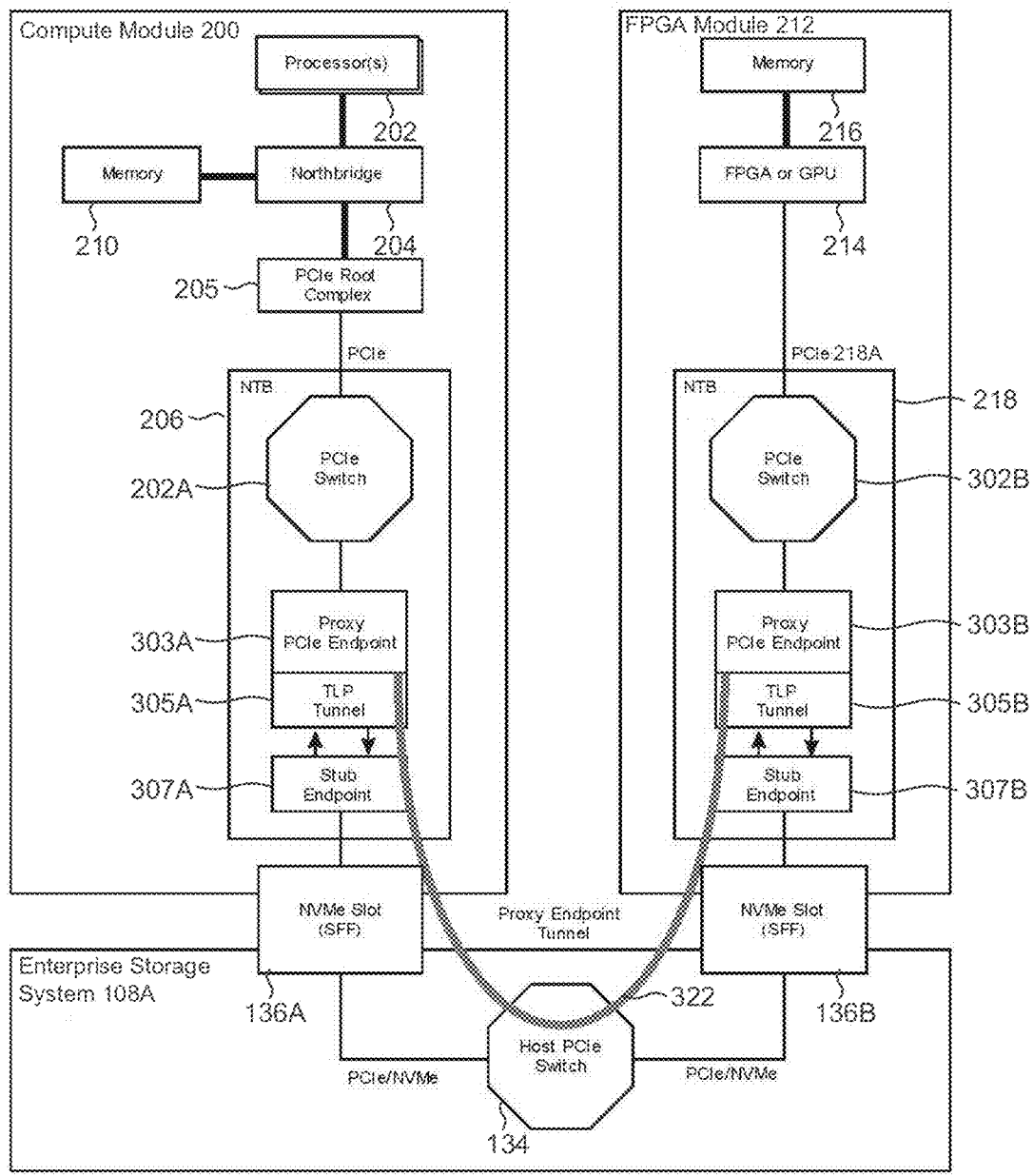
FIGS. 3B-3E show various configurations for using the innovative NTB technology of the present disclosure.

FIG. 3B shows a block diagram where the compute module 200 communicates with the FPGA module 212 using the innovative NTB 300, according to one aspect of the present disclosure. It is noteworthy that the same structure/mechanism of FIG. 3B may be used by the compute module 200 to communicate with the GPU module 222 of FIG. 2. As an example, the compute module 200 is placed at the NVMe slot 136A of the enterprise storage system 108A while the FPGA module 212 is placed at the NVMe slot 136B. NTBs 206 and 218 discover each other using the process flows described below in detail.

As shown in FIG. 3B, proxy endpoints 303A-303B are created dynamically, on an as-needed basis. The endpoints 303A and 303B communicate via a proxy endpoint tunnel 322. The TLP tunnel modules 305A and 305B are used to transmit and receive TLPs using the TLP tunnel 322 via stub endpoints 307A and 307B, respectively. The TLP traffic passes through the PCIe switch 134 of the storage system 108A. The tunnel 322 creation/configuration is described below in detail.

Figure 3C:
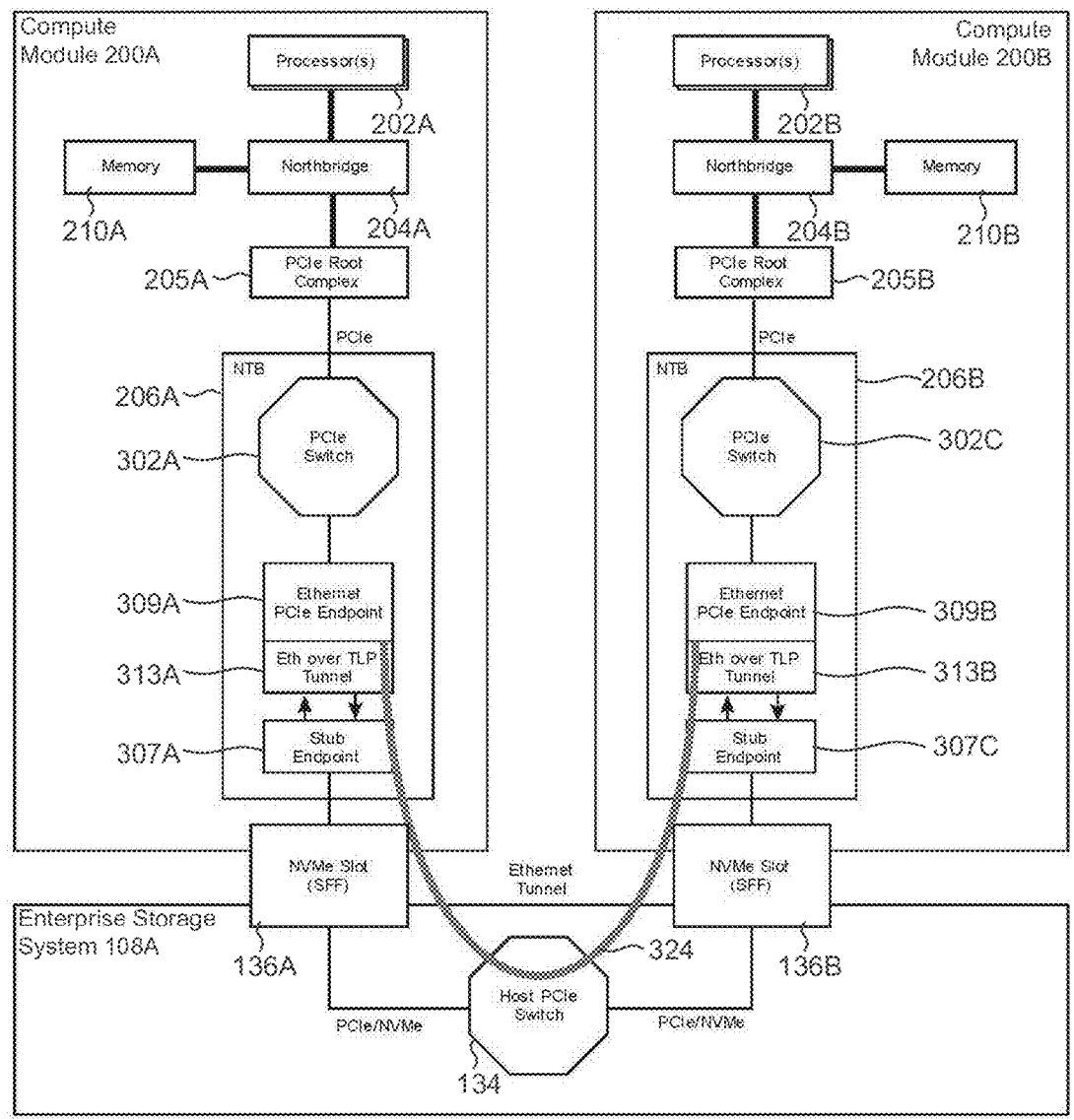

FIG. 3C shows a block diagram where at least two compute modules 200A and 200B communicate with each other using the innovative NTB and tunnelling technology of the present disclosure. Compute modules 200A and 200B include processors 202A/202B, Northbridge 204A/204B, memory 210A/210B, root complex 205A/205B and NTBs 206A/206B, described above in detail.

In one aspect, the compute modules 200A and 200B use Ethernet and TCP/IP protocols to communicate. The adaptive aspects of the present disclosure are not limited to any specific protocols. In one aspect, an Ethernet tunnel 324 is created between Ethernet endpoints 309A and 309B. The Ethernet endpoints 309A-309B are created dynamically, based on a user defined topology. The endpoints use Ethernet over TLP tunnel modules 313A and 313B to send and receive TLPs over the Ethernet tunnel 324 via stub points 307A and 307C, respectively. The process for creating and configuring tunnel 324 is also described below in detail.

Figure 3D:
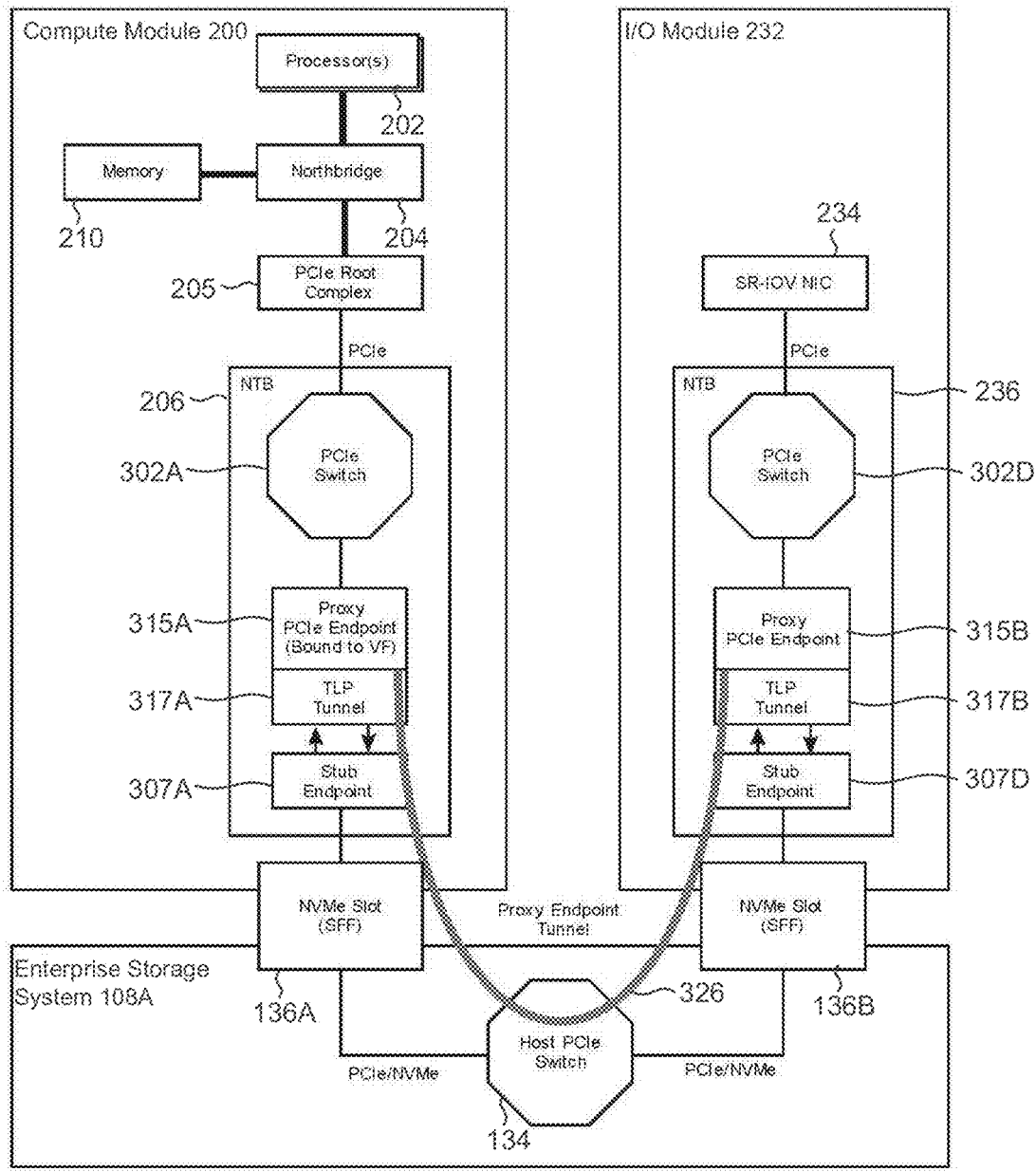

FIG. 3D shows an example of using the innovative NTB and tunnelling technology for communication between the compute module 200 and the I/O module 232, according to one aspect of the present disclosure. Compute module 200 is connected to the NVMe slot 136A, while the I/O module 232 is connected to slot 136B.

NTBs 206 creates a proxy endpoint 315A while NTB 236 uses proxy endpoint 315B. A proxy endpoint tunnel 326 is used for communication between the two modules. The TLP traffic between the modules goes through stub endpoints 307A, PCIe switch 134 and stub endpoint 307D, respectively.

In one aspect, the proxy endpoint 315A is bound to a virtual function (VF) of the I/O modules 232. A PCIe VF is a PCIe function on a network adapter that supports single root I/O virtualization (SR-IOV). The VF is associated with a PCIe Physical Function (PF) on the NIC or the NIC itself, and represents a virtualized instance of the NIC. Each VF has its own PCI Configuration space. Each VF also shares one or more physical resources on the NIC, such as an external network port, with the PF and other VFs. By using the VFs, multiple modules can access NIC resources.

Proxy endpoint 315A uses the TLP tunnel module 317A to send and receive TLPs via the proxy endpoint tunnel 326. Proxy endpoint 306B uses the TLP tunnel module 317B to send and receive packets using the proxy endpoint tunnel 326. The process for configuring the proxy endpoint tunnel 326 is also described below in detail.

Figure 3E:
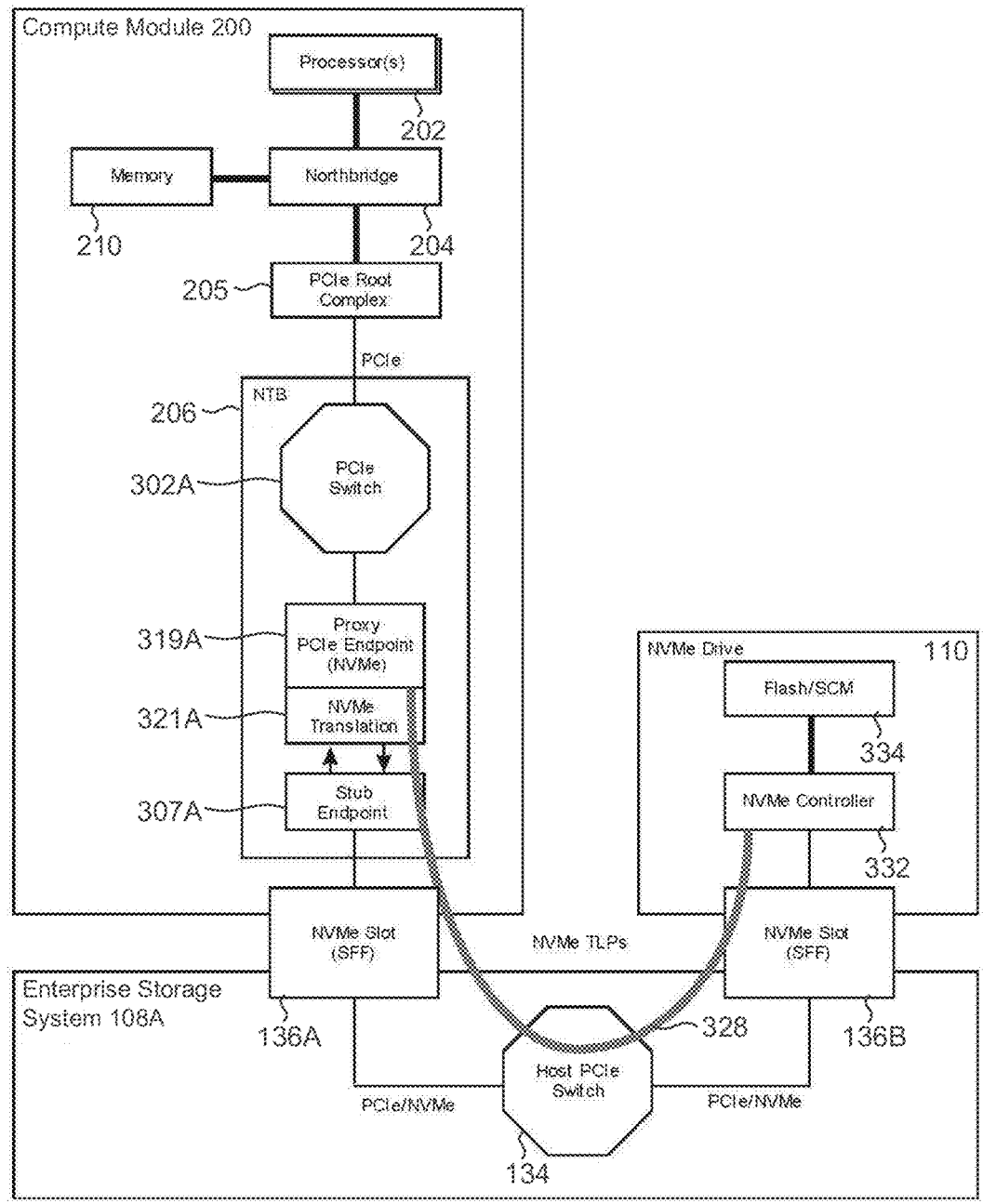

FIG. 3E shows a block diagram of the compute module 200 accessing a NVMe storage drive 110 using the innovative NTB 206, according to one aspect of the present disclosure. The NVMe drive 110 includes a NVMe controller 332 and flash or a storage class memory (SCM) (may be referred to as flash storage) 334. The NVMe controller 332 manages access to the flash storage 334.

NTB 206 generates a proxy endpoint 319A to communicate with the NVMe drive 110 using peer-to-peer TLPs 328. The peer-to-peer TPLs 328 uses the stub endpoints 307A and the PCIe switch 134. A NVMe translation module 321A is used to take NVMe I/O requests from processor 202 and translate them for the NVMe drive 110 based on the storage space that is allocated for the compute module 200.

In one aspect, the NVMe translation module 321A forwards NVMe requests between proxy endpoint 319A and the NVMe controller 332 of the NVMe storage device 110 of the storage system 108A. When messages are forwarded, certain command types may be modified to restrict certain NVMe namespaces or subsets of NVMe namespaces that are made visible to the compute module 200 operating system/software. For example, access to an "Admin Queue" may be restricted and "Submission/Completion Queues" may be hidden from the compute module 200. These queues are maintained by the NVMe controller 332 for storing and retrieving data from the NVMe storage device 110. As an example, compute module 200 may also be prevented from formatting the NVMe storage device 110. Furthermore, depending on the NVMe support level, a NVMe driver (not shown) executed by the storage system 108A may be used for allocating memory for NVMe queues.

Figure 4:
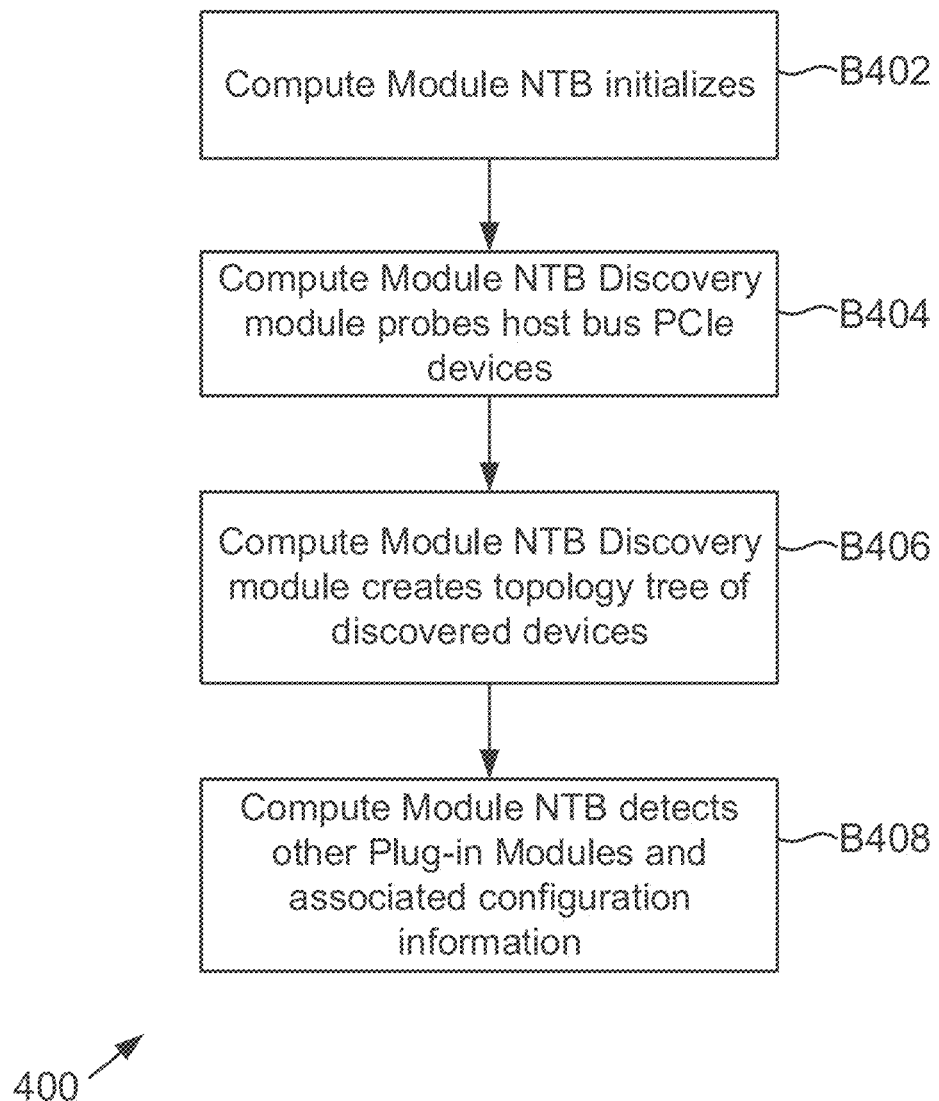
FIG. 4 shows a discovery and enumeration process, according to one aspect of the present disclosure.

Discovery/Enumeration Process Flow:

FIG. 4 shows process 400 for conducting discovery and enumeration by the NTB 206 of the compute module 200, according to one aspect of the present disclosure. It is noteworthy that in a conventional setting discovery is conducted by a root complex of a computing system and not by an NTB. The adaptive aspects of the present disclosure conduct discovery using NTB 206 that probes the PCIe bus to discover other endpoints without having to use the root complex. In one aspect, only the NTB of the compute module 200 performs discovery and enumeration and detects other pluggable module NTBs by reading the PCIe configuration space of the stub endpoint for NTB 206.

The discovery and enumeration process begins in block B402, when NTB 206 of the compute module 200 is initialized. The NTBs of the other modules (e.g. 218, 228 and 236) when plugged in, are also initialized.

In block B404, the discovery module 314 of NTB 206 probes PCIe bus devices of the storage system 108A. NTB 206 discovers the identifiers for any switches and determines if the discovered devices are reachable. The discovery module 314 (FIG. 3A) generates a topology tree of the discovered devices in block B406. Thereafter, in block B408, NTB 206 detects other NTBs in the system and any associated configuration information from the discovered NTBs. In one aspect, the pluggable module's NTB detects other pluggable module NTBs by reading the PCIe configuration space of the stub endpoint. This eliminates the need for NTB drivers that are typically used in conventional systems.

Figure 5:
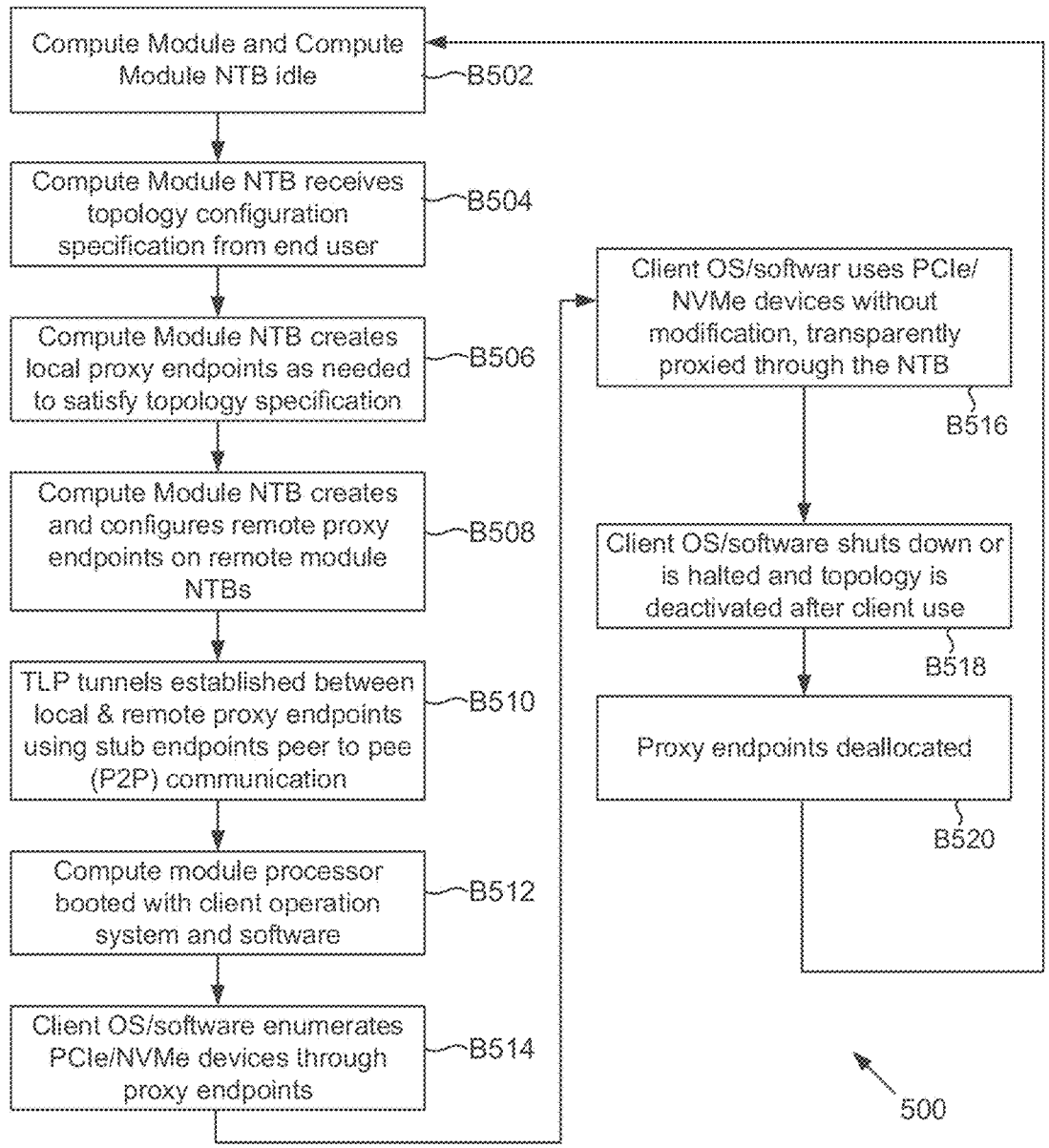
FIG. 5 shows dynamically creating topologies using the pluggable module of the present disclosure.

Dynamic Topology Creation Process Flow:

FIG. 5 shows a process 500 for dynamically creating a topology of various resources used by the pluggable modules of FIG. 2, according to one aspect of the present disclosure. The process begins in block B500 when the compute module 200 and NTB 206 are initialized and are idle.

In block B504, a user provides a topology configuration specification. The specification may specify software and hardware requirements for the topology. As an example, the user may specify using one or more of a compute module, a GPU module, an I/O module as well as NVMe storage resources provided by the storage system 108A. This information may be received via a Graphical User Interface (GUI) or a command line interface (CLI) (not shown). It is noteworthy that multiple active topologies are supported by a single storage system 108A. To create a new topology, an idle compute module 200 is selected that operates as a "topology" master.

In block B506, NTB 206 creates local proxy endpoints (e.g. 303A (FIG. 3B), 309A (FIG. 3C), 315A (FIG. 3D) 319A (FIG. 3E)) for the topology request. The type of proxy endpoint would depend on the topology, for example, for a compute to compute module configuration, the NTB creates Ethernet proxy endpoints (FIG. 3C), for using an I/O module, the proxy endpoint is bound to a VF (FIG. 3D), and to access NVMe storage, the endpoint is provided with the NVMe translation module (FIG. 3E). The configuration examples are intended to illustrate the adaptive aspects of the present disclosure and not to limit the inventive aspects to any specific configuration.

In block B508, the compute module NTB 206 creates and configures remote proxy endpoints on remote module NTBs, for example, 303B (FIG. 3B), 309B (FIG. 3C), 315B (FIG. 3D). This is enabled by NTB 206 sending requests to the remote modules to create the respective proxy endpoints.

In block B510, TLP tunnels (e.g., 322 (FIG. 3B), 324 (FIG. 3C) and 326 (FIG. 3D)) between devices specified by the topology is created. The tunnels use the stub endpoints for peer-to-peer (P2P) communication. The process for creating the tunnels is described below with respect to FIGS. 6 and 7. It is noteworthy that when a TLP tunnel is established between a compute module and a non-compute module (e.g. the FPGA module, GPU module or the I/O module), the non-compute module is identified as being allocated and may not be available for other topologies. However, a SR-IOV module (234, FIG. 3D) may allow multiple active topologies to share the PCIe resource since the TLP tunnel and the proxy endpoint are bound to a VF rather than a PF.

In block B512, the CPU module 200 is booted with client software. In block B514, the operating system or the client software enumerates the NVMe/PCIe devices using the proxy endpoints.

In block B516, the client software is able to use the NVMe/PCIe devices using the TLP tunnels and the proxy endpoints, without modification. In block B518, after the resources are used, the client software is shut down and the topology is deactivated. The proxy endpoints are de-allocated in block B520 such that other modules can use the associated resources when the resources are needed.

Figure 6:
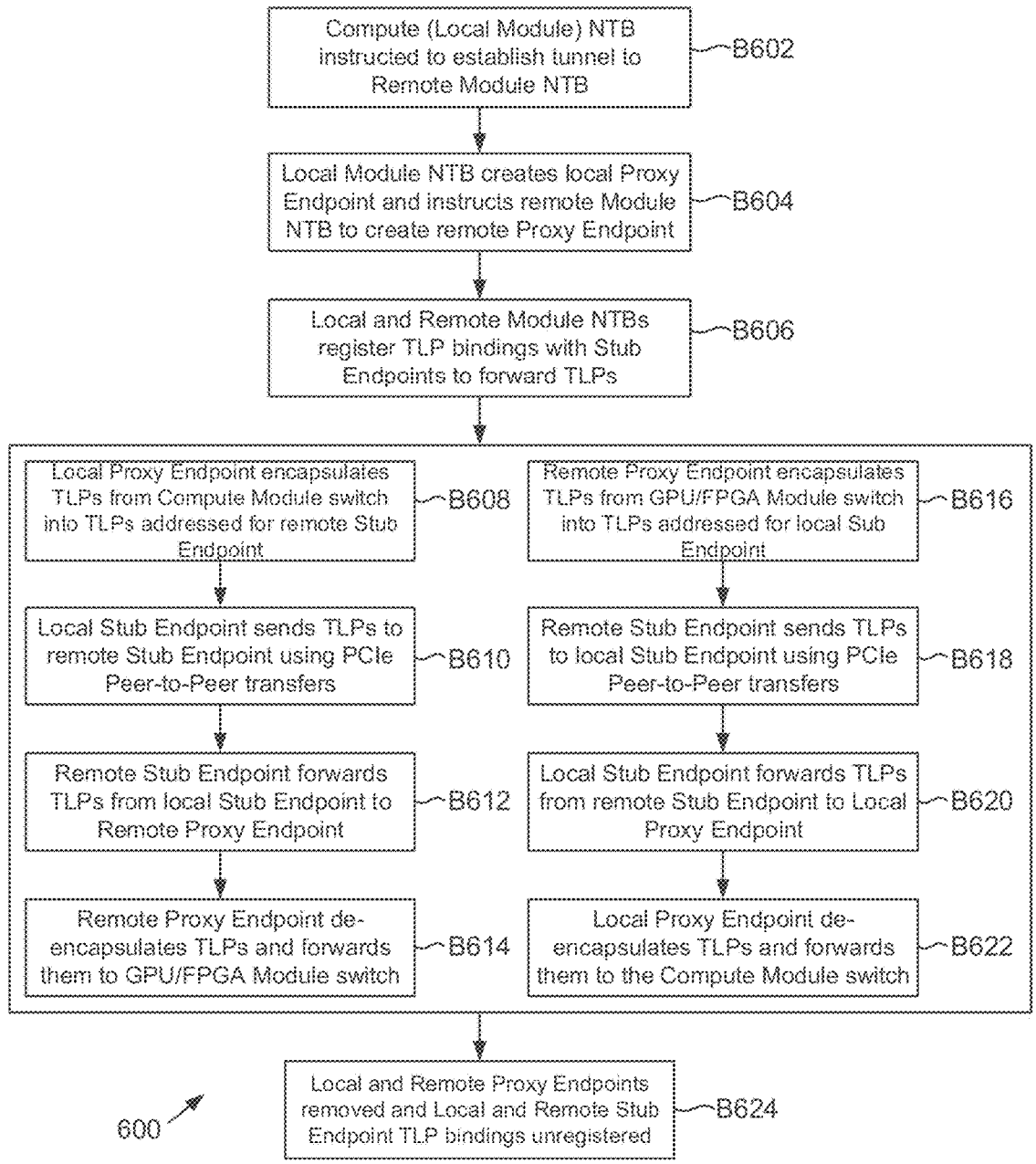
FIG. 6 shows a process for creating a module to module TLP (transaction layer protocol) tunnel, according to one aspect of the present disclosure.

Module to Module TLP Tunnelling:

FIG. 6 shows a process 600 for creating a TLP tunnel (e.g. 322, FIG. 3B) between a compute module (e.g. 200) and a FPGA module (e.g. 212) or GPU module (e.g. 222). As an example, process 600 is described with respect to the configuration of FIG. 3B, however, the adaptive aspects are not just limited to the FIG. 3B configuration.

The process begins in block B602, when the local NTB 206 is instructed to establish a tunnel with the remote NTB 218. This occurs after a topology has been created, as described above with respect to FIG. 5.

In block B604, the local NTB 206 first creates a proxy endpoint 303A and instructs the remote NTB 218 to create a remote proxy endpoint 303B.

In block B606, both the local and remote NTBs 206 and 218 register TLP bindings with their respective stub endpoints, i.e. 307A and 307B. The bindings are registered such that TLPs can be forwarded to their respective destinations. In one aspect, as an example, the TLP bindings include a device identifier that identifies the proxy endpoints, a bus identifier and PCIe addressing information to enable the stub endpoints 307A and 307B to forward TLPs.

Figure 8A:
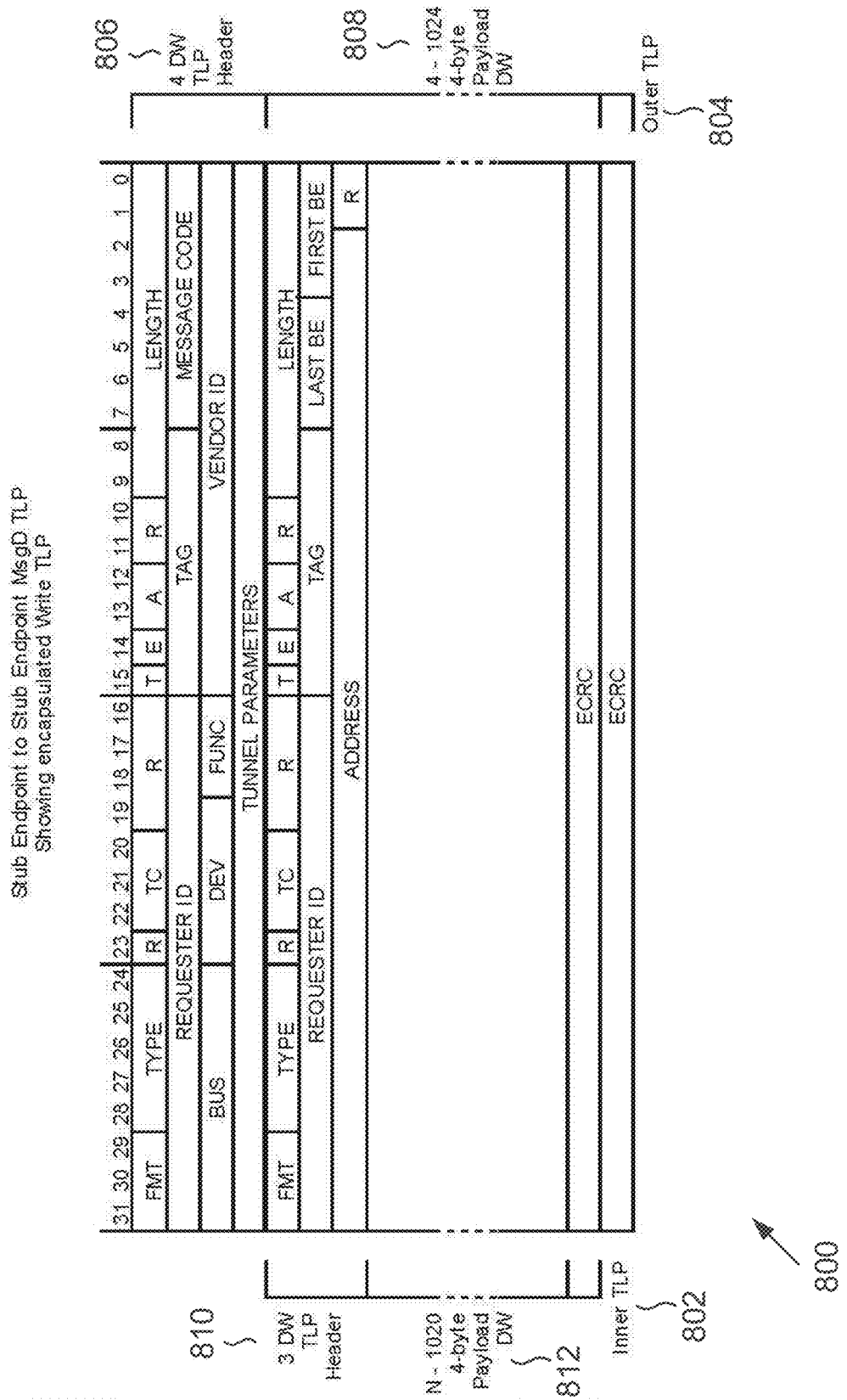
FIG. 8A shows an example of an encapsulated TLP, according to one aspect of the present disclosure.

Blocks B608-B622 describe the use of the TLP tunnel 322, according to one aspect of the present disclosure, after the tunnel is established. In block B608, the local proxy endpoint 303A encapsulates a TLP that is received from the PCIe switch 302A to a TLP addressed to the remote stub endpoint 307B. An example of the encapsulated TLP is shown in FIG. 8A and described below in detail. The encapsulated TLP is sent to the remote stub endpoint 307B in block B610, via tunnel 322 as a peer-to-peer PCIe transfer. The remote stub endpoint 307B examines the TLP and based on the addressing in the TLP, in block B612, forwards the TLP to the remote proxy endpoint 303B.

In block B614, the remote proxy endpoint 303B de-encapsulates the TLP and forwards the TLP to the PCIe switch 302B for the FPGA 214 (or for the GPU, when the GPU module is being used).

To send a response or a TLP to the local proxy endpoint 303A, in block B616, the remote proxy endpoint 303B encapsulates a TLP received from the FPGA (or GPU) into a TLP that is addressed for the local stub endpoint 307A. In block B618, the remote stub endpoint 307B sends the encapsulated TLP to the local stub endpoint 307A using tunnel 322 as a peer-to-peer PCIe transfer. The local stub endpoint 307A forwards the encapsulated TLP to the local proxy endpoint 303A in block B620. The local proxy endpoint then de-encapsulates the TLP in block B622 and forwards the TLP to switch 302A to be forwarded to processor 202. Once the endpoints are not needed, in block B624, the endpoints 303A and 303B are deleted and the TLP bindings are unregistered from stub endpoints 307A and 307B, respectively.

Figure 7:
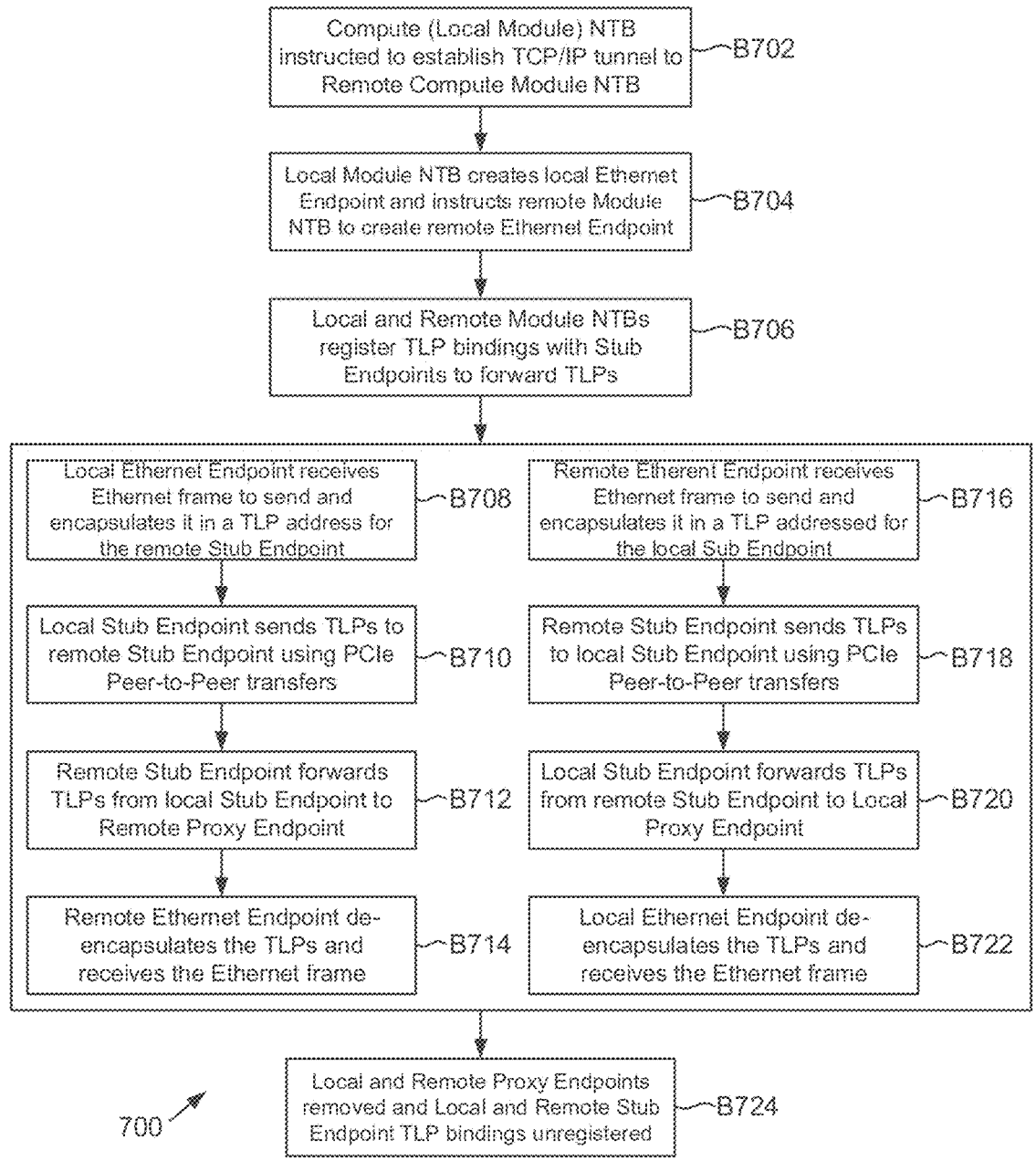
FIG. 7 shows a process for creating an Ethernet TLP tunnel between two pluggable compute modules, according to one aspect of the present disclosure.

Module to Module, Ethernet TLP Tunnelling:

FIG. 7 shows a process 700 for creating an Ethernet TLP tunnel (e.g. 324, FIG. 3C) between compute modules 202A and 202B, according to one aspect of the present disclosure. As an example, process 700 is described with respect to the configuration of FIG. 3C, however, the various adaptive aspects of the present disclosure are not limited to the configuration of FIG. 3C.

The process begins in block B702, when the local NTB 206A is instructed to establish a tunnel with the remote NTB 206B. This occurs after a topology has been created, as described above with respect to FIG. 5.

In block B704, the local NTB 206 first creates a local Ethernet endpoint 309A and instructs the remote NTB 206B to create a remote Ethernet endpoint 309B. These Ethernet endpoints use a standard Ethernet driver included within the operating system running on the compute modules.

In block B706, both the local and remote NTBs 206A and 206B register TLP bindings with their respective stub endpoints, i.e. 307A and 307C, respectively. The bindings are registered such that TLPs can be forwarded to their respective destinations. In one aspect, as an example, the TLP bindings include a device identifier that identifies the proxy endpoints, a bus identifier and PCIe addressing information to enable the stub endpoints 307A and 307C to forward TLPs.

Blocks B708-B722 describe the use of the Ethernet TLP tunnel 324, according to one aspect of the present disclosure, after the tunnel is established.

Figure 8B:
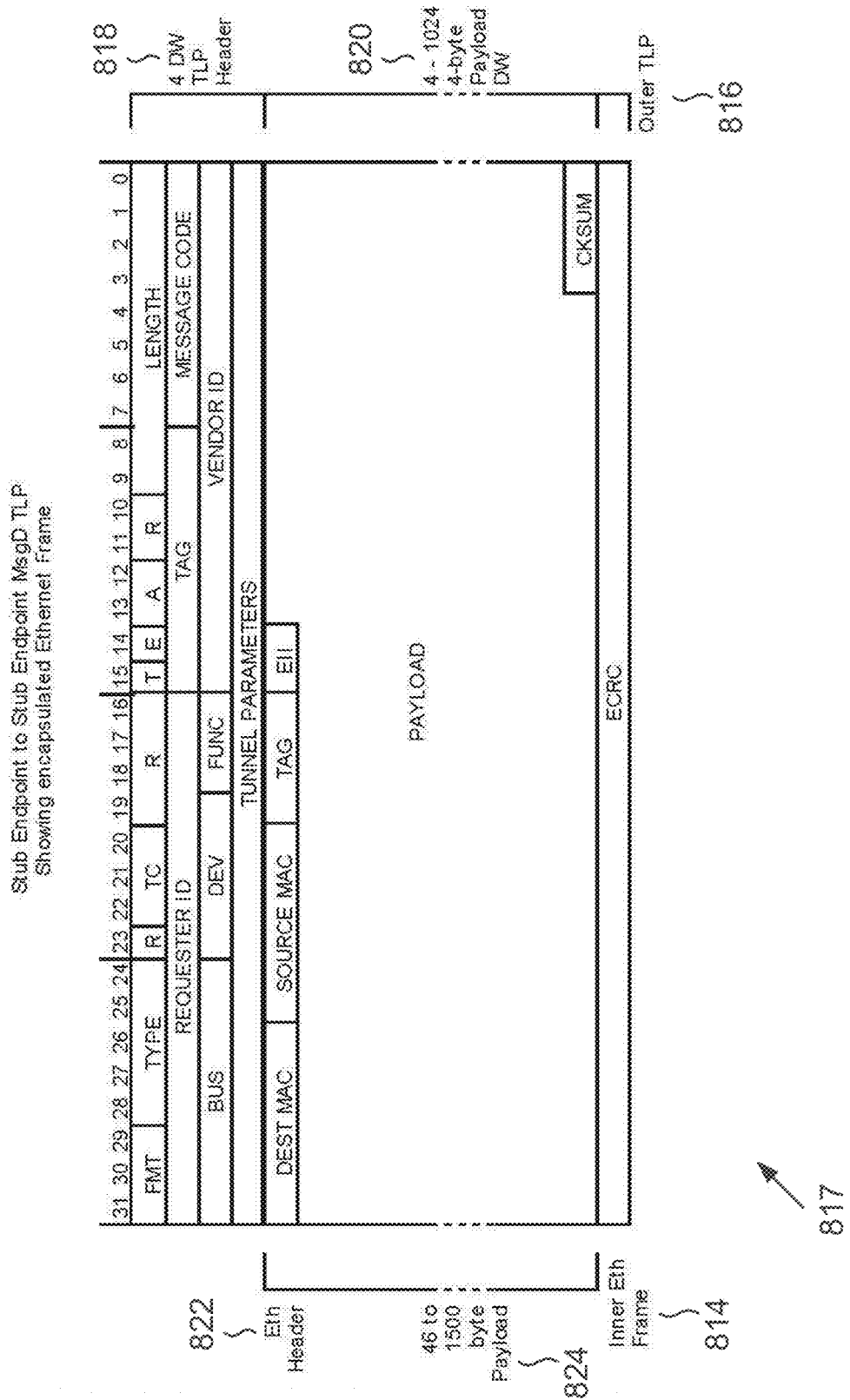
FIG. 8B shows an example of a TLP encapsulating an Ethernet frame, according to one aspect of the present disclosure.

In block B708, the local Ethernet endpoint 309A receives an Ethernet frame and encapsulates the Ethernet frame in a TLP addressed to the remote stub endpoint 307C. An example of the encapsulated TLP is shown in FIG. 8B and described below. The TLP with the Ethernet frame is sent to the remote stub endpoint 307C in block B710, via tunnel 324 as a peer-to-peer PCIe transfer.

In block B712, the remote stub endpoint 307C examines the TLP and based on the addressing in the TLP, forwards the TLP to the remote Ethernet endpoint 206B.

In block B714, the remote Ethernet endpoint 309B de-encapsulates the TLP and forward the Ethernet frame to the PCIe switch 302B. The switch then forwards the Ethernet frame to the processor 202A.

To send a response or an Ethernet frame to the local Ethernet endpoint 309A, in block B716, the remote Ethernet endpoint 309B receives an Ethernet frame from switch 302C and encapsulates the frame into a TLP addressed for the local stub endpoint 307A.

In block B718, the remote stub endpoint 307C sends the encapsulated TLP to the local stub endpoint 307A via tunnel 324 using PCIe peer-to-peer transfer. In block B720, the local stub endpoint 307A forwards the TLP to the local Ethernet endpoint 309A. The local Ethernet endpoint 309A de-encapsulates the TLP in block B722 and forwards the Ethernet frame to switch 302A to be forwarded to processor 202A. After the Ethernet endpoints are not needed, in block B724, the endpoints 309A and 309B are deleted and the TLP bindings are unregistered from stub endpoints 307A and 307C, respectively.

TLP/TLP Encapsulation:

FIG. 8A shows an example of a Stub Endpoint MSgD (Message Requests with Data) TLP 800 with an encapsulated write TLP that is transferred from stub endpoint 307A to 307B as described above with respect to FIGS. 3B and 7. The encapsulated write TLP includes an outer TLP 804 and an inner TLP 802. The outer TLP has a TLP header 806 and payload 808, and may be limited to one TLP type, such as MsgD. The inner TLP 802 includes a TLP header 810 and payload 812, and can be any TLP that is typically exchanged over the PCIe bus, including but not limited to memory reads and writes, I/O, configuration, messages, and interrupts.

It is noteworthy that if an encapsulated TLP size is greater than a maximum payload size of the PCIe bus, then the TLP is segmented. The tunnel parameters field may be used to indicate the number of TLPs, and their order. The Vendor ID field is an identifier used by the vendor providing the device.

Ethernet Frame/TLP Encapsulation:

FIG. 8B shows an example of an Ethernet frame encapsulated in a MsgD TLP 817 that is transferred from stub endpoint 307A to 307C as described above with respect to FIGS. 3C and 8. The MsgD TLP 817 includes an outer TLP 816 and an inner TLP 814. The outer TLP has a TLP header 818 and payload 820, and may be limited to one TLP type, such as MsgD. The inner TLP 814 includes an Ethernet header 822 and payload 812.

It is noteworthy that if the size of the Ethernet frame with the TLP is larger than a maximum payload size of the PCIe bus, then the Ethernet frame is encapsulated across multiple TLPs. The tunnel parameters may be used to indicate the number of TLPs, and their order. Padding may also be added to round Ethernet frame size to a multiple of X bytes, e.g. 4 bytes. The Vendor ID field is an identifier used by the vendor providing the device.

In one aspect, methods and systems for a networked system are provided. One method includes generating a first proxy endpoint by a non-transparent bridge (NTB) of a first pluggable compute module and a second proxy endpoint at a second pluggable module having a second NTB, based on a user defined topology; establishing a transaction layer packet (TLP) tunnel between the first proxy endpoint and the second proxy endpoint for peer-to-peer communication using a first stub endpoint of the first NTB and a second stub endpoint of the second NTB; and de-allocating the first proxy endpoint and the second proxy endpoint, when the topology is deactivated such that the first pluggable compute module and the second pluggable module are available for another user defined topology.

Figure 9:
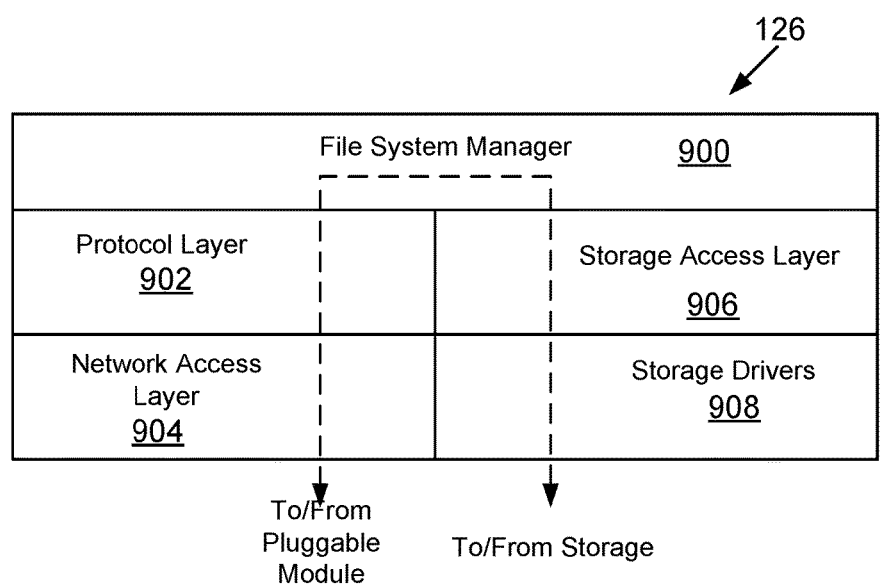
FIG. 9 shows an example of a storage operating system, used according to one aspect of the present disclosure.

Operating System:

FIG. 9 illustrates a generic example of operating system 126 executed by storage system 108A, according to one aspect of the present disclosure. Storage operating system 126 may be used by the pluggable modules described above for using storage devices and storage services.

As an example, operating system 126 may include several modules, or "layers". These layers include a file system manager 900 that keeps track of a directory structure (hierarchy) of the data stored in storage devices and manages read/write operations, i.e. executes read/write operations on storage devices in response to user requests.

Operating system 230 may also include a protocol layer 902 and an associated network access layer 904, to allow system 108A to communicate over a network with other systems. Protocol layer 902 may implement one or more of various higher-level network protocols, such as NFS, CIFS, Hypertext Transfer Protocol (HTTP), TCP/IP and others, as described below.

Network access layer 904 may include one or more drivers, which implement one or more lower-level protocols to communicate over the network, such as Ethernet.

The operating system 126 may also include a storage access layer 906 and an associated storage driver layer 908 to communicate with a storage device. The storage access layer 906 may implement a higher-level disk storage protocol, such as RAID, while the storage driver layer 308 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108A.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Thus, a method and apparatus for dynamically using resources in a storage system have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
generating, based on a first topology, a first proxy endpoint by a first device of a first pluggable compute module;
establishing a communication tunnel between the first proxy endpoint and a non-volatile memory express (NVMe) storage device for peer-to-peer communication between the first proxy endpoint of the first device and a controller of the NVMe storage device;
wherein an NVMe translation module receives a request for the NVMe storage device from the first proxy endpoint and the NVMe translation module translates the request to an NVMe request for the NVMe storage device for accessing storage space at the NVMe storage device; and
de-allocating the first proxy endpoint, when the first topology is deactivated making the first pluggable compute module and the NVMe storage device available for a second topology.

2. The method of claim 1, wherein only a portion of the storage space of the NVMe storage device is made available via the first proxy endpoint.

3. The method of claim 1, wherein the first device is a non-transparent bridge (NTB).

4. The method of claim 1, wherein the first proxy endpoint is a Peripheral Component Interconnect (PCI)-Express endpoint.

5. The method of claim 1, wherein only a portion of commands supported by the NVMe storage device is made available via the first proxy endpoint.

6. The method of claim 1, wherein the NVMe translation module forwards the NVMe request to the NVMe controller.

7. The method of claim 1, wherein the NVMe storage device is part of an enterprise storage system having a switch between the first port and the NVMe storage device.

8. A non-transitory machine-readable storage medium having stored thereon instructions for performing a method, comprising machine executable code which when executed by at least one machine, causes the machine to:

generate, based on a first topology, a first proxy endpoint by a first device of a first pluggable compute module;

establish a communication tunnel between the first proxy endpoint and a non-volatile memory express (NVMe) storage device for peer-to-peer communication between the first proxy endpoint of the first device and a controller of the NVMe storage device;

wherein an NVMe translation module receives a request for the NVMe storage device from the first proxy endpoint and the NVMe translation module translates the request to an NVMe request for the NVMe storage device for accessing storage space at the NVMe storage device; and de-allocate the first proxy endpoint, when the first topology is deactivated making the first pluggable compute module and the NVMe storage device available for a second topology.

9. The storage medium of claim 8, wherein only a portion of the storage space of the NVMe storage device is made available via the first proxy endpoint.

10. The storage medium of claim 8, wherein the first device is a non-transparent bridge (NTB).

11. The storage medium of claim 8, wherein the first proxy endpoint is a Peripheral Component Interconnect (PCI)-Express endpoint.

12. The storage medium of claim 8, wherein only a portion of commands supported by the NVMe storage device is made available via the first proxy endpoint.

13. The storage medium of claim 8, wherein the NVMe translation module forwards the NVMe request to the NVMe controller.

14. The storage medium of claim 8, wherein the NVMe storage device is part of an enterprise storage system having a switch between the first port and the NVMe storage device.

15. A system, comprising:
a first pluggable compute module having a first device;
wherein the first device, based on a first topology, generates a first proxy endpoint; and establishes a communication tunnel between the first proxy endpoint and a non-volatile memory express (NVMe) storage device for peer-to-peer communication between the first proxy endpoint of the first device and a controller of the NVMe storage device;

wherein an NVMe translation module receives a request for the NVMe storage device from the first proxy endpoint and the NVMe translation module translates the request to an NVMe request for the NVMe storage device for accessing storage space at the NVMe storage device;

wherein the first device de-allocates the first proxy endpoint, when the first topology is deactivated making the first pluggable compute module and the NVMe storage device available for a second topology.

16. The system of claim 15, wherein only a portion of the storage space of the NVMe storage device is made available via the first proxy endpoint.

17. The system of claim 15, wherein the first device is a non-transparent bridge (NTB).

18. The system of claim 15, wherein the first proxy endpoint is a Peripheral Component Interconnect (PCI)-Express endpoint.

19. The system of claim 15, wherein only a portion of commands supported by the NVMe storage device is made available via the first proxy endpoint.

20. The system of claim 15, wherein the NVMe translation module forwards the NVMe request to the NVMe controller.

* * * * *